Figure 1:
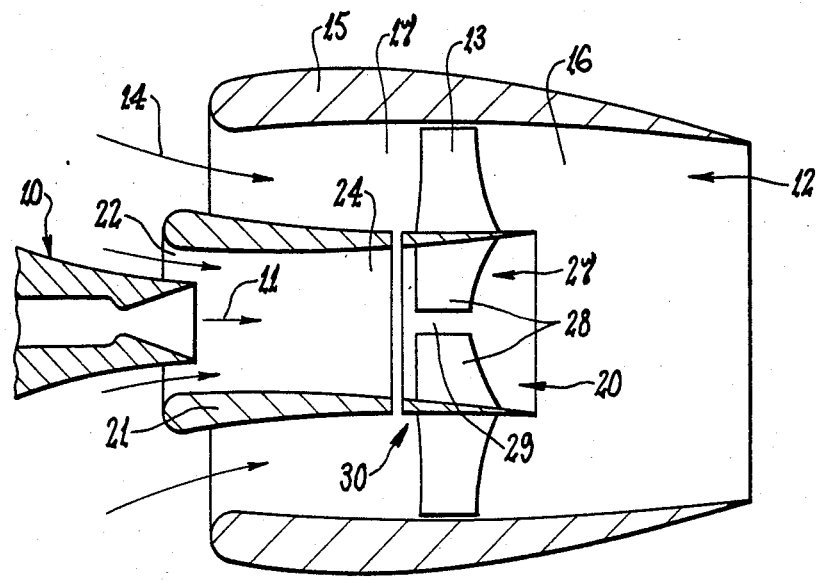

United States Patent [19]

Stewart et al.

[11] Patent Number: 4,592,202
[45] Date of Patent: Jun. 3, 1986

[54] THRUST AUGMENTOR

[75] Inventors: Derwent G. Stewart, Upper Beaconsfield; Samuel A. Fisher, Ashburton, both of Australia

[73] Assignee: Commonwealth of Australia, Australia

[21] Appl. No.: 580,452

[22] Filed: Feb. 14, 1984

[30] Foreign Application Priority Data

Feb. 15, 1983 [AU] Australia .................. PF8040

[51] Int. Cl.⁴ .................. F02K 3/04; F02K 3/00
[52] U.S. Cl. .................. 60/264; 60/269
[58] Field of Search .................. 60/226.1, 263, 264, 60/271, 269, 39.5; 414/77, 78, 79, 91; 416/193 R

[56] References Cited

U.S. PATENT DOCUMENTS

| | | | |
|---|---|---|---|
| 1,375,601 | 4/1921 | Morize | 60/264 |
| 2,430,399 | 11/1947 | Heppner | 415/79 |
| 2,478,206 | 8/1949 | Redding | 60/226.1 |
| 2,851,853 | 9/1958 | Quick | 60/264 X |
| 3,241,316 | 3/1966 | Endres | 60/263 |
| 3,279,192 | 10/1966 | Hull, Jr. et al. | 415/79 |
| 3,332,241 | 7/1967 | Coplin | 60/226.1 |
| 3,414,217 | 12/1968 | Kesting | 60/246 X |
| 3,811,791 | 5/1974 | Cotton | 60/226.1 X |
| 4,096,803 | 6/1978 | Kesting | 60/246 X |

Primary Examiner—Carlton R. Croyle
Assistant Examiner—Timothy S. Thorpe
Attorney, Agent, or Firm—Mason, Fenwick & Lawrence

[57] ABSTRACT

Thrust augmentation apparatus for a propulsive gas jet 11 including: an outer augmentor housing 15 and an inner augmentor housing 21 arranged coaxially with the jet 11. A minor air flow 25 is drawn into the inner passage 24 by an ejector effect, that flow 25 driving turbine vanes 28 projecting inwardly but terminating short of the jet 11. The vanes 28 transmit drive to fan blades 13 in the outer housing 15 to promote a thrust augmenting air flow 14. As an alternative to turbine vanes 28, gas scoops 32 may be used to develop the energy for creating the air flow 14.

3 Claims, 3 Drawing Figures

THRUST AUGMENTOR

This invention relates to apparatus for augmenting the thrust developed by a propulsive gas jet. The present invention relates particularly to thrust augmentation for rocket propulsion but the invention is not limited to this particular type of propulsive gas jet.

Rocket engines are quite inefficient at low speeds. It has been known that mixing air with the rocket exhaust gases increases the thrust at low flight speeds by increasing the mass flow while reducing the average velocity of the final gas stream. This has been achieved in the past by providing an ejector augmentor in association with the rocket outlet nozzle for the propulsive gas jet so that the low mass high velocity propulsive jet exhaust draws a substantial amount of air through the ejector augmentor to thereby increase the mass of the final exhaust gas flow. This system has been used with V/STOL aircraft.

It is an object of the present invention to provide apparatus for thrust augmentation by reducing the average final velocity of a propulsive gas jet while increasing the mass of the total propulsive gas flow.

According to the present invention there is provided thrust augmentation apparatus for use with a high speed propulsive gas jet and including: a mass flow augmentor including a plurality of fan blades arranged to extend in a radial direction relative to the axis of the gas jet, the fan blades being rotatable so as to create an increased thrust augmenting air flow in an annular region surrounding the gas jet, an augmentor drive arrangement including an inner augmentor housing having a forwardly directed inlet mouth and a passage therethrough for the gas jet, the diameter of the passage being greater than the diameter of the gas jet, so that a minor air flow is drawn into the passage through the inlet mouth upon the gas jet passing through the passage, the drive arrangement further including drive means projecting inwardly into the passage and terminating before reaching the longitudinal axis of the passage, the drive means being arranged to encounter the minor air flow, the drive means being operably coupled to the fan blades of the mass flow augmentor so that the minor air flow provides driving energy for the drive means which in turn drives the fan blades of the mass flow augmentor. The thrust augmenting air flow increases the total mass of the propulsive gas flow. The use of the minor air flow in the inner augmentor housing to provide the driving energy for the fan blades means that no high temperature resistant components need to encounter the gas jet but sufficient driving force for the fan blades is nevertheless developed.

Preferably the mass flow augmentor includes an outer augmentor housing having a passage therethrough, the outer augmentor housing being arranged coaxially with the inner augmentor housing so as to define an annular space between the inner and outer augmentor housings for the thrust augmenting air flow, the fan blades being arranged within the annular space. The outer augmentor housing encloses and directs the augmenting air flow and the augmented thrust is developed partly at the leading edge of the mouth at the front of the outer augmentor housing due to the large flow into the annular region around the mouth.

The drive means preferably comprises a plurality of radially inwardly extending turbine vanes, the turbine vanes extending inwardly a distance so as to leave a central opening through the general plane of the turbine vanes for passage therethrough of the propulsive gas jet, the turbine vanes intercepting the minor air flow so as to be driven thereby. The use of turbine vanes in the drive means is expected to be relatively simple to manufacture and be quite efficient in operation. Furthermore, to help provide simplicity of construction, the fan blades and the turbine vanes may be both part of a unitary rotary assembly so that the turbine vanes and the fan blades rotate at the same speed.

As an alternative to drive turbine vanes, the drive means may comprise a plurality of gas scoops arranged to collect gas from the minor air flow in the inner augmentor housing and to discharge the collected gas to the annular region surrounding the outside of the inner augmentor housing, the gas scoops being rotatably mounted so that the interception of the minor air flow and collection and discharge of gas by the gas scoops causes rotation thereof, the gas scoops being drivingly coupled to drive the fan blades. This use of gas scoops is also expected to be quite efficient in developing the driving energy for the fan blades from the minor air flow.

The gas collected by the gas scoops and discharged to the annular region may be directed partially circumferentially relative to the axis of the gas jet to thereby produce a turning moment of force acting on the gas scoops, this turning moment being used for developing the drive for the fan blades. Alternatively, or in addition the gas collected by the gas scoops and discharged to the annular region may be directed at least partially rearwardly so as to promote by an ejector effect induction of the thrust augmenting air flow in the annular space between the inner and outer augmentor housings. The gas scoops may have shaped portions defining the fan blades located within the annular space.

Figure 2:
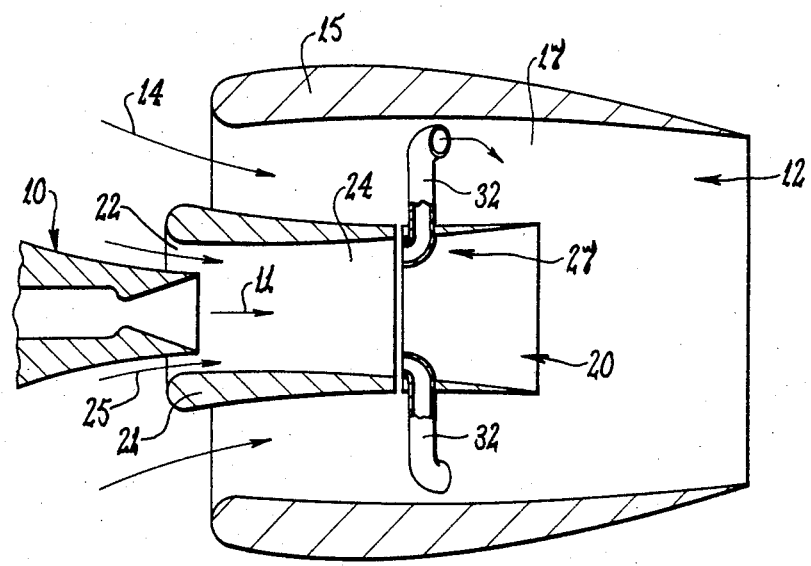
Figure 3:
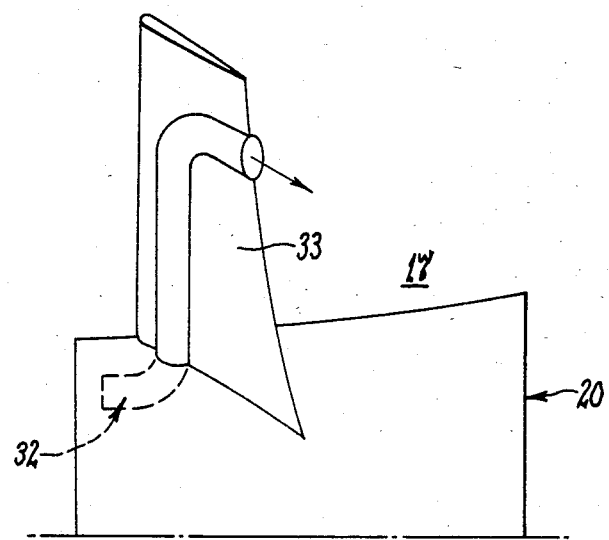

The thrust augmentation apparatus will now be described with particular reference to the accompanying drawings, in which:

FIG. 1 illustrates in cross section a first possible embodiment of thrust augmentation apparatus according to the present invention, FIG. 2 illustrates in cross section an alternative embodiment, and FIG. 3 illustrates a section of gas scoop with fan shaped portions constituting a third embodiment according to the present invention.

Referring to the drawings, the thrust augmentation apparatus is shown associated with a rocket nozzle 10 from which a high speed propulsive gas jet 11 emerges. The apparatus includes a mass flow augmentor 12 including a plurality of fan or compressor blades 13 extending in a radial direction relative to the axis of the gas jet 11. The blades 13 are rotatable so as to create an increased thrust augmenting air flow 14 in an annular region surrounding the gas jet 11. The apparatus also includes an augmentor drive arrangement 20 including an inner augmentor housing 21 having a forwardly directed inlet mouth 22 and a passage 24 therethrough for the gas jet 11. The diameter of the passage 24 is greater than the diameter of the gas jet 11, so that a minor air flow 25 is drawn into the passage 24 through the inlet mouth 22 upon the gas jet 11 passing through the passage 24. The drive arrangement further includes drive means 27 projecting inwardly into the passage 24 and terminating before reaching the longitudinal axis of the passage 24 along which the gas jet 11 passes. The drive means 27 encounters the minor air flow 25. The drive means 27 is operably coupled to the fan blades 13 of the mass flow augmentor 12 so that the minor air flow 25 provides driving energy for the drive means 27 which in turn drives the fan blades 13 of the mass flow augmentor 12.

The mass flow augmentor 12 includes an outer augmentor housing 15 having a passage 16 therethrough, the outer augmentor housing 15 being arranged coaxially with the inner augmentor housing 21 so as to define an annular space 17 between the inner and outer augmentor housings 21, 15 for the thrust augmenting air flow 14. The fan blades 13 are arranged within the annular space 17 to draw the air flow 14 therethrough.

Specifically referring now to the FIG. 1 embodiment, the drive means 27 comprises a central turbine portion having a plurality of radially inwardly extending turbine vanes 28, the turbine vanes 28 extending inwardly a distance so as to leave a central opening 29 through the general plane of the turbine vanes 28 for passage therethrough of the propulsive gas jet 11. The turbine vanes 28 intercept the minor air flow 25 so as to be driven thereby. The rotation of the turbine vanes 28 is transmitted to the fan blades 13 for creating or assisting the thrust augmenting air flow 14.

In the illustrated case where the apparatus is used in association with a rocket nozzle 10, the gas temperature of the rocket exhaust jet 11 may be too great for long term operation of the turbine vanes 28 and therefore the central opening 29 through the general plane of the turbine vanes 28 allows the passage of the very hot exhaust gases.

The inner augmentor housing 21 having the passage 24 therethrough for the high speed propulsive gas jet 11 is arranged coaxially with the outer augmentor housing 15 and within the passage 16 in the outer augmentor housing 15. The minor air flow 25 in the passage 24 may make only a minor contribution to the increased final flow mass. In the FIG. 1 arrangement having central opening 29 through the vanes 28, the minor air flow 25 may mix somewhat with the central hot gas flow 11 so that, with suitably dimensioned turbine vanes 28, it is the minor flow and this gas mixture which contacts the turbine vanes 28 and provides the driving force for the fan blades 13 in the outer augmentor housing 15. Thus in the case of apparatus for use with rocket engines, the turbine vanes 28 need not be built so as to withstand the very high temperatures of the rocket exhaust 11.

It will be appreciated that in the first embodiment using radially inwardly extending turbine vanes 28 in the drive arrangement 27, the fan blades 13 and the turbine vanes 28 are both parts of a unitary rotary assembly 30 so that the turbine 28 and the fan 13 rotate at the same rotational speed. The unitary assembly 30 may be mounted by means of suitable bearings (not shown), for example to the inner augmentor housing 21. Alternatively, suitable gearing may be incorporated between the turbine 28 and fan 13 to provide speed reduction.

In summary, the first embodiment of the apparatus of the present invention as described above in relation to FIG. 1 would be mounted in operative association with rocket exhaust nozzle 10 so that the rocket outlet nozzle 10 is directed axially along the passage 24 in the inner augmentor 21. The hot high-speed propulsive gas jet 11 from the rocket exhaust nozzle 10 flows axially through the inner augmentor 21 and creates a minor air flow 25 through the inner augmentor passage 24, the minor air flow 25 forming a mixture with the hot exhaust 11, this mixture contacting and driving the turbine vanes 28 extending radially inwardly into the passage 24 through the inner augmentor 21. The rotation of the turbine 28 is transmitted to the air fan 13 which is located radially outwardly around the outside of the inner augmentor 21 but within the outer augmentor 15. The rotation of the air fan 13 draws relatively large quantities of air through the outer augmentor 15 so that the total propulsive gas flow out of the exhaust end of the apparatus is of substantially greater mass than the rocket exhaust gas jet 11 but has, of course, a lower average velocity than the rocket exhaust jet 11.

In the FIG. 2 embodiment, the drive means 27 comprises a plurality of gas scoops 32 arranged to collect gas from the minor air flow 25 in the inner augmentor housing 21 and to discharge the collected gas to the annular region 17 surrounding the outside of the inner augmentor housing 21. The gas scoops 32 are rotatably mounted so that the interception of the minor air flow 25 and collection and discharge of gas by the gas scoops 32 causes rotation thereof. The gas scoops 32 are drivingly coupled to drive the fan blades 13.

The gas collected by the gas scoops 32 and discharged to the annular region 17 is directed partially circumferentially relative to the axis of the gas jet 11 to thereby produce a turning moment of force acting on the gas scoops 32. Also the gas collected by the gas scoops 32 and discharged to the annular region 17 is directed partially rearwardly so as to promote by an ejector effect induction of the thrust augmenting air flow 14 in the annular space 17 between the inner and outer augmentor housings 21,15.

The FIG. 3 embodiment is a variant of the FIG. 2 embodiment in that the gas scoops have shaped portions 33 defining the fan blades located within the annular space 17. Alternatively in an embodiment not illustrated the gas scoops 32 may be mounted so as to define part of a unitary construction which also includes separate fan blades.

The operation of the FIGS. 2 and 3 embodiments of the apparatus according to the present invention is analagous to the FIG. 1 embodiment. Instead of the turbine vanes 28 creating the turning movement which is transmitted to the air fan 13, in the FIGS. 2 and 3 embodiments the gas scoops 32 collect gas and convey it radially outwardly where it is discharged in a direction so as to produce the rotary motion for inducing the air flow 14.

In a further embodiment not illustrated, say in the case where the scoops 32 are shaped to act as blades so as to induce the thrust augmenting air flow 14, the scoops 32 may be quite long and be shaped so as to act as propellor blades so that the provision of the outer augmentor housing 15 is unnecessary.

Finally, it is to be understood that various alterations, modifications and/or additions may be made to the construction and arrangement of parts as herein described without departing from the scope of the present invention as defined in the appended claims.

We claim:

1. Thrust augmentation apparatus for use with a high temperature, high speed rocket exhaust gas jet from a rocket nozzle including: a mass flow augmentor for creating an increased thrust augmenting air flow in an annular region surrounding the rocket exhaust gas jet; an augmentor drive arrangement including an inner augmentor housing having a forwardly directed inlet mouth and a passage therethrough for receiving the rocket exhaust gas jet, the diameter of the passage being greater than the outer diameter of the rocket exhaust gas jet, so that a minor air flow of ambient air is drawn into the passage through the inlet mouth by the rocket exhaust gas jet, the diameter of the passage being greater than the outer diameter of the rocket exhaust gas jet, so that a minor air flow of ambient air is drawn into the passage through the inlet mouth by the rocket exhaust gas jet and mixes with a part of the rocket exhaust gas jet to create mixed minor air flow of lower temperature than the rocket exhaust gas jet which mixed minor air flow passes through the passage, the augmentor drive arrangement further including drive means projecting inwardly into the passage and terminating radially outward of the longitudinal axis of the passage, the drive means being arranged to encounter the mixed minor air flow but not the high temperature rocket exhaust gas jet; the mass flow augmentor including an outer augmentor housing having a passage therethrough, the outer augmentor housing being arranged coaxially with and outwardly of the inner augmentor housing so as to define an annular space between the inner and outer augmentor housings for said thrust augmenting air flow, the mass flow augmentor further including a plurality of fan blades arranged within said annular space and extending in a radial direction relative to the axis of the rocket exhaust gas jet; said drive means being operably coupled to the fan blades of the mass flow augmentor so that the mixed minor air flow reacts with the drive means to provide driving energy for the drive means which in turn drives the fan blades of the mass flow augmentor to cause them to rotate and thereby create said thrust augmenting air flow in said annular region.

2. Thrust augmentation apparatus as claimed in claim 1 wherein the drive means comprises a plurality of radially inwardly extending turbine vanes, the turbine vanes extending inwardly a distance so as to leave a central opening through the general plane of the turbine vanes for unimpended passage therethrough of the rocket gas jet, the turbine vanes extending only into the mixed minor air flow so as to be driven thereby.

3. Thrust augmentation apparatus as claimed in claim 2 wherein the fan blades and the turbine vanes are both part of a unitary rotary assembly so that the turbine vanes and the fan blades rotate at the same speed.

* * * * *